United States Patent
Spence

[15] 3,669,466
[45] June 13, 1972

[54] CABLE-STEERED VEHICLE HAVING A CABLE TENSIONING AND ACTUATING ASSEMBLY THEREFOR

[72] Inventor: William George Spence, 2375 Wilson Avenue, Apt. 8, Montreal 260, Quebec, Canada

[22] Filed: Dec. 21, 1970

[21] Appl. No.: 99,963

[52] U.S. Cl. ................................... 280/91, 74/470, 74/496
[51] Int. Cl. ........................................................... B62d 1/00
[58] Field of Search .............. 280/91, 93, 87; 74/501.5, 496, 74/506, 470

[56] References Cited

UNITED STATES PATENTS

| | | | |
|---|---|---|---|
| 1,383,644 | 7/1921 | Lang | 280/91 |
| 3,018,116 | 1/1962 | Summers et al. | 280/91 |
| 3,203,270 | 8/1965 | Booth | 74/506 |

*Primary Examiner*—Gerald M. Forlenza
*Assistant Examiner*—Frank G. Werner
*Attorney*—Pierre Lesperance

[57] ABSTRACT

A steering cable assembly adapted to tension and actuate a steering cable adapted to tension and actuate a steering cable in a cable-steered vehicle. A cable assembly of the above type which includes two spools to attach and wind the ends of the cable, a bevel gear coaxially secured at one end of each spool, the toothed faces of the bevel gears facing each other in spaced-apart relation, along a common steering axle, at least one of the two gears is rotatable around the common steering axle, a locking element is arranged to engage between the teeth of each gear to releasably lock the gears together for concomitant rotation, and when disengaged, to allow relative rotation between the two gears and the attached spools upon insertion and rotation of a toothed tool in meshing engagement with both gears.

11 Claims, 11 Drawing Figures

INVENTOR
William George SPENCE
BY Pierre Lespérance
AGENT

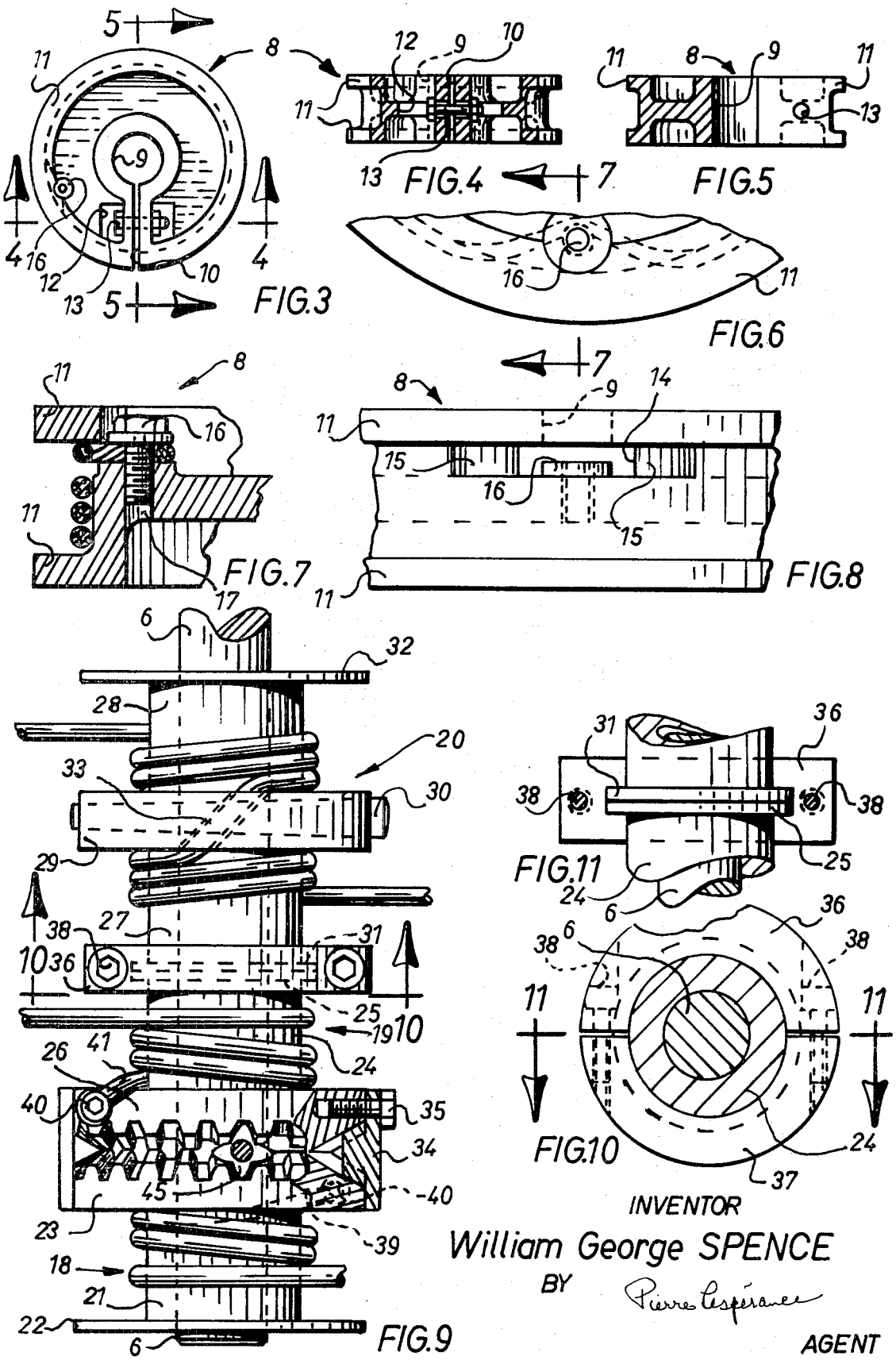

CABLE-STEERED VEHICLE HAVING A CABLE TENSIONING AND ACTUATING ASSEMBLY THEREFOR

This invention relates to a cable-steered vehicle and, more particularly, to a cable tensioning and actuating assembly therefor.

U.S. Pat. No. 2,628,848 is typical of the state-of-the-art concerning the cable-steered vehicle. In the above Patent, four-wheel steering is obtained by a cable system, including one pulley associated to each road wheel by means of a normally vertical pivot post and a cable running around the four pulleys. Tensioning of the cable is done by turnbuckles and the actuation of the cable is done by a pulley around which the cable is wounded. Such cable system has been found unsatisfactory for appropriate occasional tensioning of the cable and alignment of the road wheels. A cable system as defined in the above patent is particularly disadvantageous, since the cable is not positively connected to the supporting pulleys and there results slippage of the cable and unsatisfactory steering caused by irregular pivoting of the normally vertical pivot posts.

It is a general object of the invention to provide a cable-steered vehicle with a cable system, avoiding substantially all the above deficiencies.

It is a further object of the invention to provide a cable system having a cable run around releasable pulleys to allow easy alignment of the road wheels.

It is still another object of the invention to provide a cable system having a cable running on pulleys and positively attached thereto to practically avoid longitudinal slippage of the cable thereon.

The invention will now be described in detail with reference to a preferred embodiment illustrated, by way of example only, in the accompanying drawings, in which:

FIG. 3 is a top view of a pulley according to the invention;

Figures 1, 2:
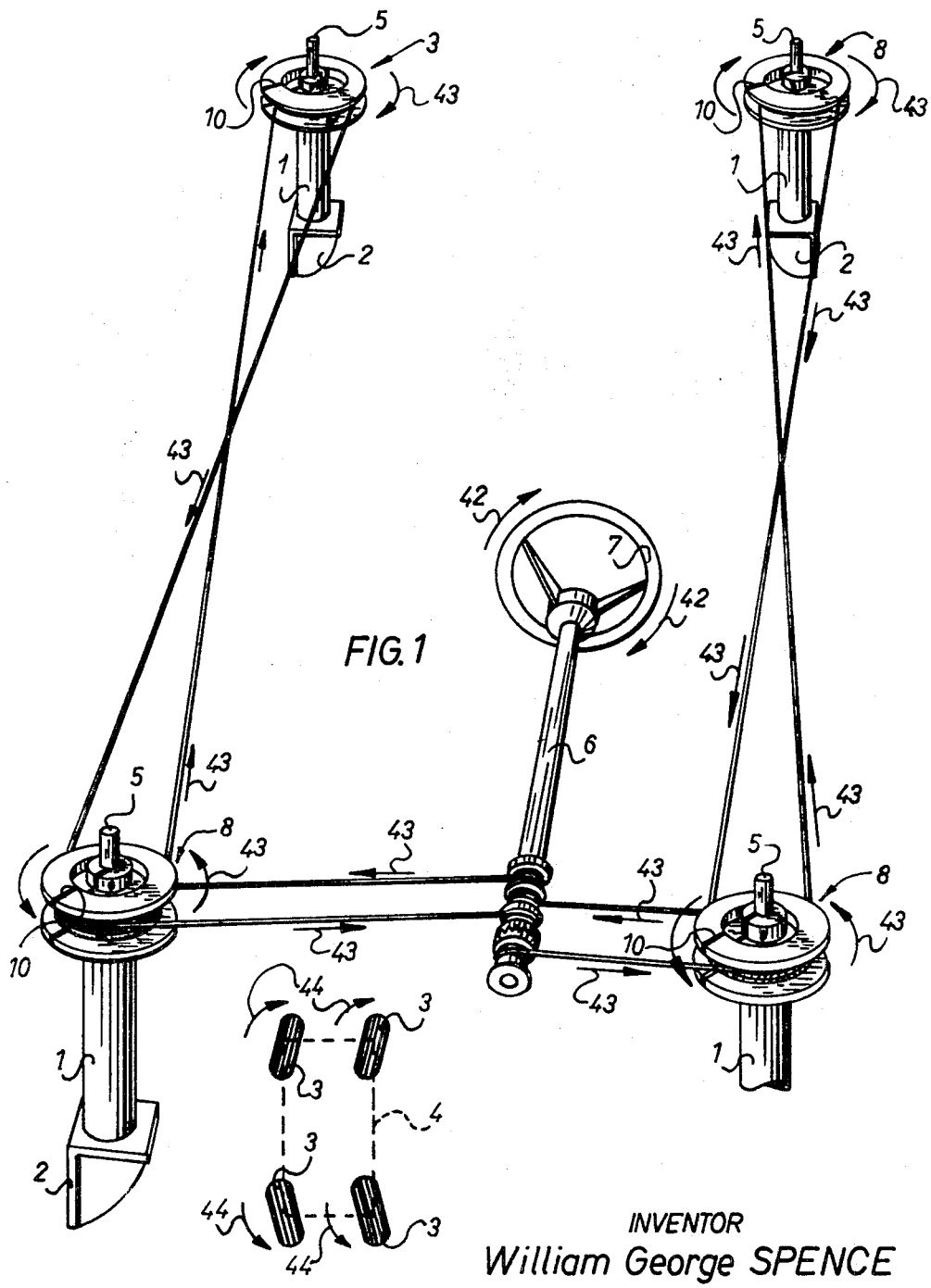
FIG. 1 is a perspective view of a cable tensioning and actuating system for a four-wheel cable-steered vehicle.
FIG. 2 is a schematic view illustrating the mode of steering action on the respective road wheels.

FIGS. 4 and 5 are cross-sectional views as seen along lines 4—4 and 5—5 respectively in FIG. 3;

FIG. 7 is a cross-sectional view as seen along line 7—7 in FIG. 6;

FIG. 8 is a side view of the part of the pulley shown in FIG. 6, as seen from the bottom of the latter;

FIG. 9 is an enlarged view of a tensioning assembly according to the invention;

FIG. 10 is a cross-section as seen along line 10—10 in FIG. 9;

FIG. 11 is a cross-section as seen along line 11—11 in FIG. 10.

Referring now particularly to FIGS. 1 and 2, there are shown four posts 1, each having a bracket 2 to rotatably support a road wheel 3. The four posts 1 are provided to be attached to the body of a vehicle, shown by dotted lines 4, to form normally vertical pivot for the front and rear road wheels 3. A wheel driving axle 5 extends rotatably inside each normally vertical pivot post 1 and is drivingly connected to the corresponding wheel 3, in a manner which does not form part of the present invention. A steering axle 6 having a steering wheel 7 fixed at the upper end thereof is rotatably mounted about its longitudinal axis, in any well known manner, relative to the body of the vehicle.

The cable steering system will be hereinafter described in relation with the afore-mentioned parts of the four-wheel drive vehicle.

A pulley 8 adapted to be releasably fixed to the normally vertical pivot post 1 will now be described with reference to FIGS. 3 to 8 inclusive. Each pulley 8 has a central bore 9 arranged to engage the periphery of a pivot post 1. A radial slot 10 extends from the radial bore 9 to the periphery of each pulley 8. The latter has a pair of spaced-apart annular flanges 11 to restrict the lateral displacement of the cable. The flanges 11 extend along the edges of the slot 10; cutouts 12 are provided on opposite sides of the radial slot 10 and the flanges thereof, and a bolt 13 is inserted through the flanges of the radial slot 10 to releasably tighten the flanges of the latter towards each other and fixedly secured each pulley on the corresponding pivot post 1. Unscrewing of a bolt 13 allows to loosen the associated pulley 8 on a pivot post 1 and thereby allows pivoting of the latter and the road wheel suspended therefrom, whereby the alignment of the associated road wheel is made quite simple. An opening 14 is provided into the periphery of each pulley 8 intermediate the flange 11 thereof. Curved edges 15 are formed on opposite sides of each opening 14 and a screw 16 is threaded into a bore 17 provided radially inwardly of the opening 14 to positively attach the cable to the pulleys, as best seen in FIG. 7.

A cable tensioning and actuating assembly will now be described with reference to FIGS. 9, 10, and 11. The cable tensioning and actuating assembly comprises, a first spool 18, a second spool 19 and a third spool 20, which are rotatable relative to the common steering axle 6. The first spool 18 has a drum 21, a flange 22 at one end and a bevel gear 23 at the other end of the drum 21. Similarly, the second spool 19 has a drum 24, a flange 25 at one end and a second bevel gear 26 at the other end of the drum 24. The third spool 20 is of double drum construction having two cylindrical drums 27 and 28 separated from each other by an intermediate annular flange 29. A tapering pin 30 extends into aligned transverse bores provided through the annular flange 29 and the steering axle 6. Flanges 31 and 32 are provided at the opposite ends of the third spool 20. A bore 33 extends obliquely through the annular flange 29 for the passage of the cable therethrough. The toothed face of the first bevel gear 23 faces the toothed face of the second bevel gear 26 in spaced-apart relationship relative thereto. A truncated wedge block 34 is shaped to engage between teeth of each of the two bevel gears 23 and 26 to lock the latter together for concomitant or bodily rotation thereof. A screw 35 or any other suitable expedient may be used to hold the truncated wedge block 34 in locking position. A pair of C-shape coupling portions 26 and 37, having a circular groove on the inner surface thereof are clamped by a pair of screws 38 or the like with the flanges 25 and 31 engaging into the circular groove thereof, whereby to hold the second and the third spools 19 and 20 rigidly connected together for bodily rotation with the common steering axle 6.

A cable is wound around the spools and the pulleys in a manner which will now be described in detail with reference to FIGS. 1 and 9. One end 39 of the cable is fixed by a screw 40, or the like, into a recess on the non-toothed side of the bevel gear 23 and, similarly, the other end 41 of the cable is fixed by another screw 40, or the like, into a recess on the non-toothed side of the bevel gear 26. The cable starting from the end 39 is wound around the drum 21 of the first spool 18, extends to the pulley 8 for the front wheel on the left side of the vehicle, and is fixed to the latter pulley 8 by a screw 16. Similarly, the cable starting from the end 41 is wound around the drum 24 of the second spool 19 extends to the pulley 8 for the front wheel on the right side of the vehicle, and is fixed to the latter pulley 8 by screw 16. From the front pulleys 8, the cable is wound a few turns around the rear pulley 8 on the same side of the vehicle and extends back to the same front pulley 8 defining two runs of cable crossing each other on each side of the vehicle, such as to reverse the direction of rotation of the rear wheels relative to the front wheels. Farther from the ends 39 and 41, the cable is wound a few turns around the front pulleys, extends from one front pulley to the other, and is wound a few turns on the drums 27 and 28 and passes through the oblique passage 33.

As can be seen in FIG. 1, the winding direction around the pulley 8 and the drums of the spools is such that, upon rotation of the steering wheel 7 in the angular direction indicated by the arrows 42, the cable will be displaced longitudinally, as indicated by the arrows 43, caused by the rotation of the spools with the steering axle 6. As indicated by the arrows 44 in FIG. 2, there results a simultaneous leftward steering of the front wheels and a rightward steering of the rear wheels 3. Obviously, rotation of the steering wheel 7 in opposite direction relative to the arrows 42, results in movements of the cable and the road wheels in opposite directions relative to the arrows 43 and 44.

To tauten the cable, the screw 35 and the truncated wedge block 34 are removed and the screws 38 are untighten to free the spools 18 and 19 relative to each other and to the steering axle 6. The four pulleys 8 are also untighten to allow rotation thereof relative to the pivot post 1, such as not to disturb the alignment of the wheels 3. A gear or toothed element 45 forming part of a handtool, not shown, is inserted into the space between the toothed faces of the gears 23 and 26 in engagement between teeth of each of the gears 23 and 26. Upon rotation of the gear 45 in the proper direction, the cable is wound further on both spools 18 and 19. When the desired tension in the cable has been obtained, the pulleys 8, the coupling portions 36 and 37, and the truncated wedge block 34 are all secured firmly and the gear 45 is removed.

When alignment of the road wheels 3 needs to be corrected, the pulleys 8 can be untightened for angular adjustment of the pivot posts 1 relative to the body of the vehicle.

It should be understood by anyone skilled in the art that various modifications may be made to the details of construction of the cable tensioning assembly without departing from the spirit and scope of the invention as defined in the appended claims.

What I claim is:

1. In a vehicle steered by a vehicle system having a first cable end and a second cable end, a cable tensioning assembly comprising a first spool rotatably mounted about its axis, a second spool rotatably mounted about its axis, said first cable end being secured to said first spool for winding thereon, said second cable end being secured relative to said second spool for winding thereon, a first gear rigidly fixed to said first spool for rotation therewith, a second gear rigidly fixed to said second spool for rotation therewith, and a connecting means constructed and arranged to couple said first gear to said second gear for concomitant rotation of one gear with the other and to uncouple said first gear from said second gear to allow differential rotation of one gear relative to the other.

2. In a vehicle as defined in claim 1, wherein said first gear and said second gear are positioned adjacent each other and are arranged to be engaged by an actuating means to cause said differential rotation of one gear relative to the other.

3. In a vehicle as defined in claim 2, wherein said first and second spools and said first and second gears are coaxially arranged with said first gear and said second gear facing each other in spaced-apart relation along said common axis.

4. In a vehicle as defined in claim 3, wherein said first gear and said second gear are bevel gears having each a toothed face facing the toothed face of the other and spaced therefrom and arranged to mesh with a toothed tool forming said actuating means.

5. In a vehicle as defined in claim 4, wherein said connecting means forms a truncated wedge piece arranged to be releasably secured between teeth of each of said first and second gears to lock the latter for bodily movement thereof.

6. In a vehicle as defined in claim 3, wherein said first and second spools and said first and second spools and said first and second gears are mounted on a common steering axle, and are arranged for rotation relative thereto, said second spool has said second gear fixed at one end thereof and has one flange fixed at the other end thereof, a third spool is rotatable on said common steering axle, said third spool has one flange at each end, a releasable coupling constructed and arranged to releasably convert said one flange of said second spool to one of said flanges of said third spool, and a fastening means is arranged to releasably fix said third spool on said common steering axle for bodily rotation therewith.

7. In a vehicle as defined in claim 6, wherein said third spool has an annular flange intermediate its ends defining a first and a second third spool portions on opposite sides thereof, a cable passage extends from one side to the other of said flange, and said fastening means is a locking pin arranged to engage into transversely extending bores through said intermediate annular flange and said common steering axle, whereby to fix said third spool to said common steering axle for bodily rotation therewith.

8. In a vehicle as defined in claim 1, wherein said connecting means is arranged to releasably engage between teeth of said first and second gears to lock the latter together for bodily movement thereof.

9. In a vehicle as defined in claim 1, further having two front wheels and two rear wheels, each of said wheels is rotatably supported by a normally vertical pivot post, a pulley is fixed on each of said normally vertical pivot post and arranged to be angularly adjusted relative thereto, said cable system is a cable extending from said first to said second cable ends, wound around said pulleys and said spools, and arranged to rotate said normally vertical pivot post to steer said wheels.

10. In a vehicle as defined in claim 9, wherein said cable forms a pair of runs extending between a common steering axle and each of said two front wheels and a pair of runs extending between the pulleys of a front and a rear wheels along each side of the vehicle, and the two runs extending between the pulleys along each side of the vehicle are crossed intermediate their pulleys to produce opposite angular steering of the front wheels relative to the rear wheels.

11. In a vehicle as defined in claim 9, wherein said cable is positively attached to each of said angularly adjustable pulley, whereby to prevent longitudinal slippage of the cable thereon.

* * * * *